United States Patent
Rohr et al.

(10) Patent No.: US 8,555,018 B1
(45) Date of Patent: Oct. 8, 2013

(54) TECHNIQUES FOR STORING DATA

(75) Inventors: Vincent M. Rohr, Woodinville, WA (US); Andrew A. Kimbrough, Seattle, WA (US); Chris A. Suver, Seattle, WA (US)

(73) Assignee: Amazon Technologies, Inc., Reno, NV (US)

( * ) Notice: Subject to any disclaimer, the term of this patent is extended or adjusted under 35 U.S.C. 154(b) by 360 days.

(21) Appl. No.: 12/722,466

(22) Filed: Mar. 11, 2010

(51) Int. Cl.
*G06F 13/28* (2006.01)

(52) U.S. Cl.
USPC ........... 711/165; 711/117; 711/154; 711/202; 709/226; 707/758

(58) Field of Classification Search
None
See application file for complete search history.

(56) References Cited

U.S. PATENT DOCUMENTS

| | | | | |
|---|---|---|---|---|
| 5,359,365 A * | 10/1994 | Enokida | | 348/390.1 |
| 5,440,737 A * | 8/1995 | Uchinuma | | 1/1 |
| 5,822,780 A * | 10/1998 | Schutzman | | 711/165 |
| 6,065,019 A * | 5/2000 | Ault et al. | | 1/1 |
| 6,804,719 B1 * | 10/2004 | Cabrera et al. | | 709/226 |
| 6,839,803 B1 * | 1/2005 | Loh et al. | | 711/113 |
| 7,062,624 B2 * | 6/2006 | Kano | | 711/165 |
| 7,155,593 B2 * | 12/2006 | Kano | | 711/165 |
| 7,281,109 B2 * | 10/2007 | Kano | | 711/165 |
| 7,328,325 B1 * | 2/2008 | Solis et al. | | 711/202 |
| 7,434,017 B2 * | 10/2008 | Maruyama et al. | | 711/165 |
| 7,509,409 B2 * | 3/2009 | Penny et al. | | 709/223 |
| 7,596,587 B2 * | 9/2009 | Berkhin et al. | | 1/1 |
| 8,001,327 B2 * | 8/2011 | Mimatsu | | 711/117 |
| 8,359,444 B2 * | 1/2013 | Arakawa | | 711/165 |
| 2006/0041719 A1 * | 2/2006 | Chui et al. | | 711/117 |
| 2006/0064555 A1 * | 3/2006 | Prahlad et al. | | 711/154 |
| 2007/0208788 A1 * | 9/2007 | Chakravarty et al. | | 707/204 |
| 2008/0104081 A1 * | 5/2008 | Mimatsu | | 707/10 |
| 2008/0126404 A1 * | 5/2008 | Slik et al. | | 707/103 R |
| 2010/0077168 A1 * | 3/2010 | Arakawa | | 711/165 |
| 2010/0274826 A1 * | 10/2010 | Takata et al. | | 707/812 |
| 2010/0306731 A1 * | 12/2010 | Aitken et al. | | 717/104 |
| 2011/0010514 A1 * | 1/2011 | Benhase et al. | | 711/162 |
| 2011/0106863 A1 * | 5/2011 | Mamidi et al. | | 707/823 |

* cited by examiner

*Primary Examiner* — Hung Le
(74) *Attorney, Agent, or Firm* — Kilpatrick Townsend & Stockton LLP

(57) ABSTRACT

Techniques for providing access to data are disclosed. In an embodiment, a method for providing access to data involves storing data among a plurality of data stores where at least two of the data stores differ in at least one ability to perform a data operation. A mapping associates data containers with locations of corresponding data among the data stores. At least a portion of the data is redistributed among the data stores according to at least one policy that defines where among the data stores said at least a portion of the data should be stored. A request from a requestor to access particular data corresponding a data container is received and the particular data is located using the mapping. The particular data is provided to the requestor.

26 Claims, 5 Drawing Sheets

TECHNIQUES FOR STORING DATA

BACKGROUND

Organizations constantly struggle to reduce the cost of their operations, while at the same time increase the amount of operations being performed. For example, businesses that sell products and/or services struggle to reduce the cost of providing their products and/or services while at the same time increasing the amount of products and/or services that they provide. One way of addressing this struggle is through the use of computer systems, which play a significant, if not central, role in the operations of many organizations. For instance, many businesses sell and/or promote various products and services using electronic environments, such as may utilize Internet-based technologies. Additionally, accounting, order processing, human resources, and other operations are often performed utilizing computer systems in order to optimize efficiency and effectiveness. Typically, the use of computer systems in an organization's operations involves a significant investment in software and/or hardware. When making these investments, organizations anticipate not only their current needs, but also their future needs in order to avoid system failures that may cause a loss of business through lost opportunity and adverse public opinion.

Working against organizations is the ever changing demand on systems. Not only may the demand on systems gradually increase over time as business grows, but system demand may fluctuate significantly over periods of time. For example, servers for an operator of an electronic marketplace may experience large peak traffic during some periods of the year, such as during the winter holiday season, and small amounts of traffic at other times. Hardware is often deployed by guessing what the future will be and trying to make sure there is enough capacity to meet those needs. When faced with these challenges, organizations often err on the side of having too many resources rather than not having enough. The resulting excess capacity is expensive and costly to maintain, and typically requires a significant capital expenditure up front that will not be quickly recovered due to the limited use.

DETAILED DESCRIPTION OF THE INVENTION

Disclosed herein are techniques, including systems and methods, for dynamic system scaling up and down as well as efficient and cost effective use of system resources. In an embodiment, a system is disclosed that, as the load of data requests on the system increases, provisions more resources automatically. The system may also provision fewer resources automatically as the load of data requests on the system decrease.

In an embodiment, resources are provisioned by promoting and/or demoting data among a plurality of data stores, which may have varied performance characteristics and which may be interchangeable such that they can be changed over time. In an embodiment, one or more policies are applied which may include criteria for detecting when to move data from one data store to another. The policies may be based at least in part on one or more criteria relating to the amount of time that has passed since data was last accessed, or relating to other factors. The data may be associated with data containers and a data container may be associated with data from one or more data stores such that applications may request data in terms of a container with which the data is associated. In this manner, applications do not need to identify where among the data stores data is located.

In an embodiment, a mapping is maintained that identifies where data is located among the data stores. When data is added to one or more of the data stores, in an embodiment, the mapping is updated to reflect the location of the data among the data stores. Also, in an embodiment, when data is moved from one data store to another, the mapping is updated to reflect the current location of the data among the data stores.

Figure 1:
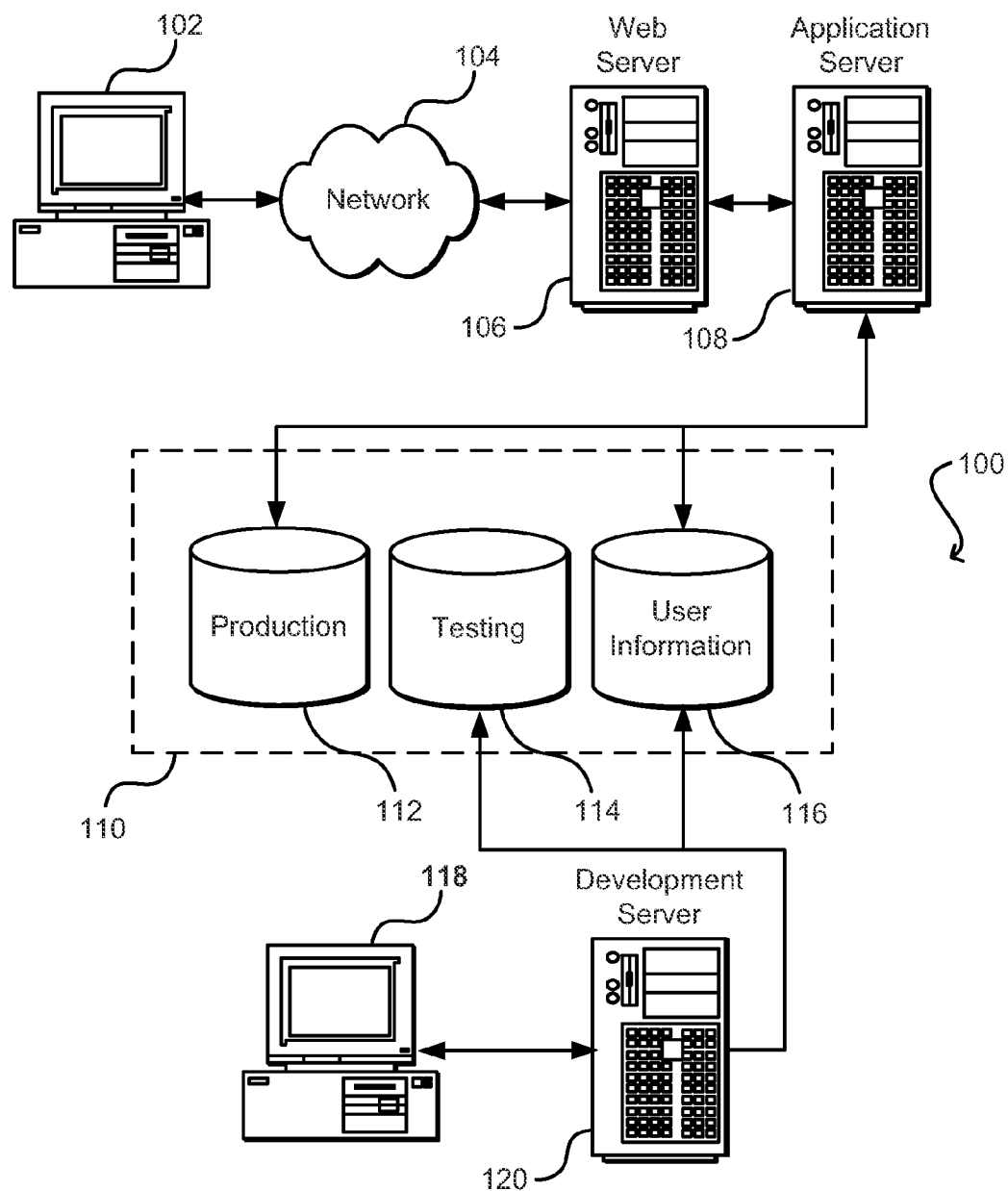
FIG. 1 illustrates an environment in which various embodiments can be implemented.

FIG. 1 illustrates an example of an environment 100 for implementing aspects in accordance with various embodiments. As will be appreciated, although a Web-based environment is used for purposes of explanation, different environments may be used, as appropriate, to implement various embodiments. The environment 100 shown includes both a testing or development portion (or side) and a production portion. The production portion includes an electronic client device 102, which can include any appropriate device operable to send and receive requests, messages, or information over an appropriate network 104 and convey information back to a user of the device. Examples of such client devices include personal computers, cell phones, handheld messaging devices, laptop computers, set-top boxes, personal data assistants, electronic book readers, and the like. The network can include any appropriate network, including an intranet, the Internet, a cellular network, a local area network, or any other such network or combination thereof. Components used for such a system can depend at least in part upon the type of network and/or environment selected. Protocols and components for communicating via such a network are well known and will not be discussed herein in detail. Communication over the network can be enabled by wired or wireless connections, and combinations thereof. In this example, the network includes the Internet, as the environment includes a Web server 106 for receiving requests and serving content in response thereto, although for other networks an alternative device serving a similar purpose could be used as would be apparent to one of ordinary skill in the art.

The illustrative environment includes at least one application server 108 and a data store 110. It should be understood that there can be several application servers, layers, or other elements, processes, or components, which may be chained or otherwise configured, which can interact to perform tasks such as obtaining data from an appropriate data store. As used herein the term "data store" refers to any device or combination of devices capable of storing, accessing, and retrieving data, which may include any combination and number of data servers, databases, data storage devices, and data storage media, in any standard, distributed, or clustered environment. The application server can include any appropriate hardware and software for integrating with the data store as needed to execute aspects of one or more applications for the client device, handling a majority of the data access and business logic for an application. The application server provides access control services in cooperation with the data store, and is able to generate content such as text, graphics, audio, and/or video to be transferred to the user, which may be served to the user by the Web server in the form of HTML, XML, or another appropriate structured language in this example. The handling of all requests and responses, as well as the delivery of content between the client device 102 and the application server 108, can be handled by the Web server. It should be understood that the Web and application servers are not required and are merely example components, as structured code discussed herein can be executed on any appropriate device or host machine as discussed elsewhere herein. Further, the environment can be architected in such a way that a test automation framework can be provided as a service to which a user or application can subscribe. A test automation framework can be provided as an implementation of any of the various testing patterns discussed herein, although various other implementations can be used as well, as discussed or suggested herein.

The environment also includes a development and/or testing side, which includes a user device 118 allowing a user such as a developer, data administrator, or tester to access the system. The user device 118 can be any appropriate device or machine, such as is described above with respect to the client device 102. The environment also includes a development server 120, which functions similar to the application server 108 but typically runs code during development and testing before the code is deployed and executed on the production side and is accessible to outside users, for example. In some embodiments, an application server can function as a development server, and separate production and testing storage may not be used.

The data store 110 can include several separate data tables, databases, or other data storage mechanisms and media for storing data relating to a particular aspect. For example, the data store illustrated includes mechanisms for storing production data 112 and user information 116, which can be used to serve content for the production side. The data store also is shown to include a mechanism for storing testing data 114, which can be used with the user information for the testing side. It should be understood that there can be many other aspects that may need to be stored in the data store, such as for page image information and access right information, which can be stored in any of the above listed mechanisms as appropriate or in additional mechanisms in the data store 110. The data store 110 is operable, through logic associated therewith, to receive instructions from the application server 108 or development server 120, and obtain, update, or otherwise process data in response thereto. In one example, a user might submit a search request for a certain type of item. In this case, the data store might access the user information to verify the identity of the user, and can access the catalog detail information to obtain information about items of that type. The information then can be returned to the user, such as in a results listing on a Web page that the user is able to view via a browser on the user device 102. Information for a particular item of interest can be viewed in a dedicated page or window of the browser.

Each server typically will include an operating system that provides executable program instructions for the general administration and operation of that server, and typically will include a computer-readable medium storing instructions that, when executed by a processor of the server, allow the server to perform its intended functions. Suitable implementations for the operating system and general functionality of the servers are known or commercially available, and are readily implemented by persons having ordinary skill in the art, particularly in light of the disclosure herein.

The environment in one embodiment is a distributed computing environment utilizing several computer systems and components that are interconnected via communication links, using one or more computer networks or direct connections. However, it will be appreciated by those of ordinary skill in the art that such a system could operate equally well in a system having fewer or a greater number of components than are illustrated in FIG. 1. Thus, the depiction of the system 100 in FIG. 1 should be taken as being illustrative in nature, and not limiting to the scope of the disclosure.

Figure 2:
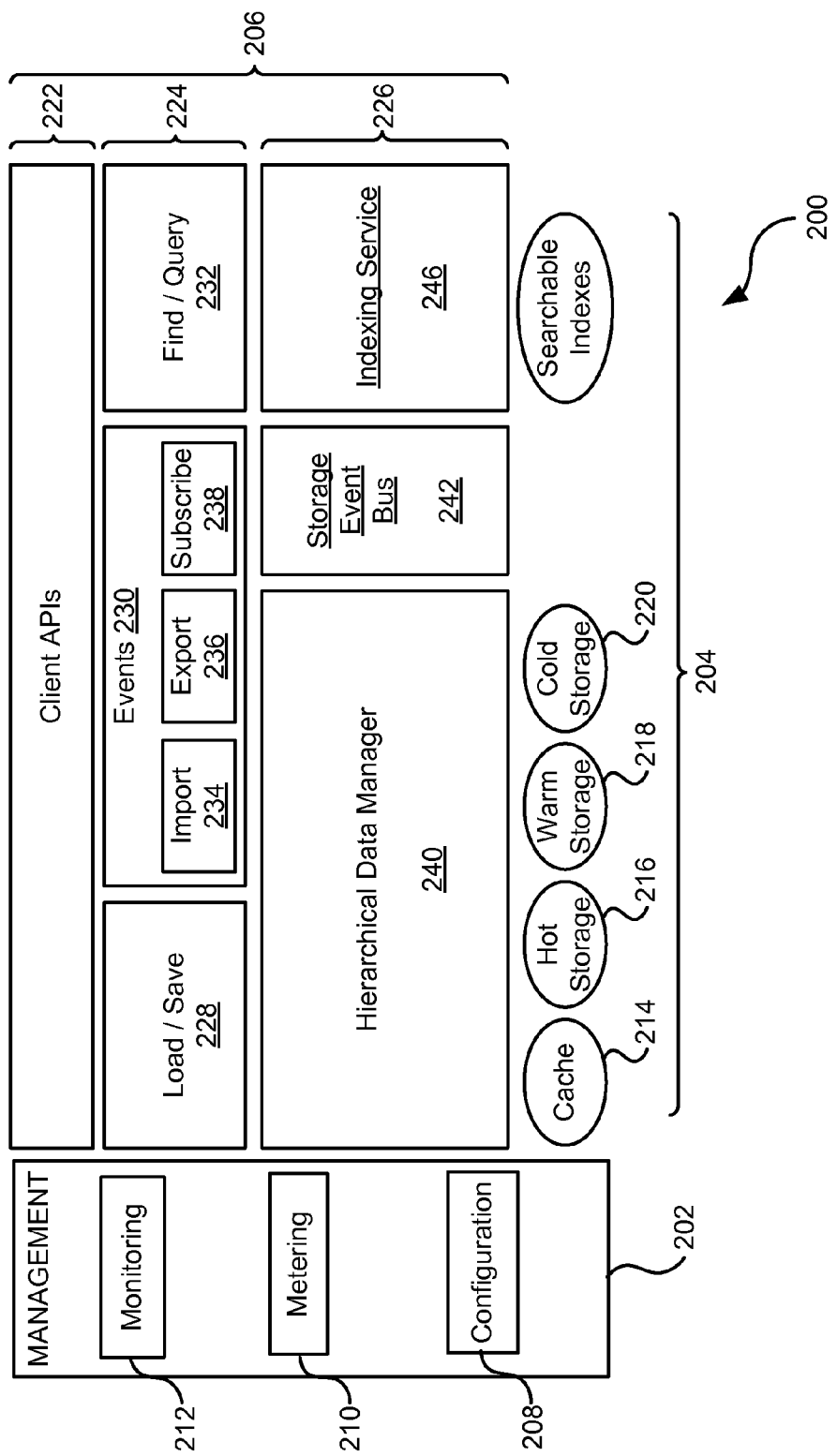
FIG. 2 is a diagrammatic representation of a platform for providing access to data that may utilize the environment of FIG. 1, in accordance with an embodiment.

The environment shown in FIG. 1 may be useful for implementation of various embodiments of the present disclosure, such as for an organization desiring to manage its own data effectively or to provide data storage and access as a service to third parties. FIG. 2 shows a platform 200 for providing access to data, in accordance with an embodiment. Components of the platform 200 may be integrated into a system utilizing some or all of the components shown in FIG. 1, as well as additional components. In an embodiment, the platform includes a management component 202, a data storage component 204, and a data management component 206. The management component 202, in an embodiment, is a system, which may be implemented utilizing hardware shown in FIG. 1, and which may be used for organizational operations and customer management. The management component 202 may include enterprise resource planning (ERP) and customer relationship management (CRM) software and hardware components that utilize the data management component 204, such as by utilizing application programming interfaces (APIs) of the data management component 204. The management component, for example, may process and track customer orders, manage customer and internal operational information, and perform other functions applicable to a particular organization utilizing the platform 200. As shown in the drawing, the management component 202 includes a configuration component 208 for configuring system resources, a metering component 210 for metering system resources, and a monitoring component 212 for monitoring system resources.

The data storage component 204, in an embodiment, comprises a plurality of data stores. One or more of the data stores may utilize a logical schema, such as a schema that organizes data into a plurality of tables of a relational database management system (RDBMS), or other schemas for organizing data. The data stores may all utilize the same schema, or may utilize different schemas.

In the example platform of FIG. 2, the data storage component 204 includes a cache 214, hot data storage 216, warm data storage 218, and cold data storage 220. In an embodiment, the cache 214 comprises temporary storage of data, such as data currently being processed, frequently accessed data, and/or other data. In an embodiment, data in the cache is deleted or moved to another data store after a period of time.

The hot data storage 216, warm data storage 218, and cold data storage 220, in an embodiment, are different data stores for persistently storing data where each data store may have differing performance characteristics. The performance characteristics may be related to the speed at which operations on the data, such as create, read, update, and/or delete ("CRUD") operations, are performed and/or may be related to other capabilities of the data stores, such as the particular types of operations that may be performed on data in the data stores, such as whether data in a data store can be locked. In an embodiment, the speed of one or more comparable CRUD operations are fastest with the hot data storage 216, the slowest with the cold data storage 220, and at a speed between the hot data storage 216 and cold data storage 220 with the warm data storage 218. The hot, warm, cold and other tiers of storage may be realized by various hardware and software combinations, and one or more tiers of storage may operate on different platforms. For instance, the hot data storage 216 may include a relational database implemented with fast hardware while the warm data storage 218 may be the same or another relational database implemented with slower hardware, which may be cheaper to obtain and/or operate than the fast hardware. The cold data storage 220 (or another tier) may be data storage that is implemented as part of a cloud storage solution or other cost-effective storage. In an embodiment, at least two of the data stores differ in their abilities to perform data operations. For example, the hot data storage 216 and warm data storage 218 may be able to write and update data while the cold data storage 218 may be able to only read data. While the example shows three performance-based tiers of data storage (hot, warm, cold), there may be fewer than three tiers or more than three tiers, and there may be several data stores at the same tier. In addition, any number of physical storage units, such as hard disks, may be utilized in order to implement the hot data storage 216, warm data storage 218, and cold data storage 220. Further, more than one tier of data storage may be implemented on a single physical storage unit, such as by encrypting and/or compressing a portion of data on a physical storage unit while not encrypting and/or compressing another portion of the data on the physical storage unit, where the encrypted and/or compressed data is part of one tier of storage while the unencrypted and/or uncompressed data is part of another tier.

Use of several performance-related tiers of data storage provides several advantages. Typically, the cost of storing data is related to the performance of the data store in which the data is stored. For instance, quick access of data may require expensive software and/or hardware for managing the data, while large amounts of data storage may be possible using less expensive software and/or hardware that does not provide the same performance. Further, techniques for increasing the amount of data that may be stored (or for performing other functions), such as data compression and/or encryption, may reduce the speed at which data may be accessed. Thus, the use of multiple tiers of data storage allows an organization to use more expensive, high-performance data storage for some data while using less-expensive, lower-performance data storage for other data. For instance, the behavior of an application—such as an application used in processing customer orders placed through an electronic marketplace—is often based at least in part on the speed at which the application can perform operations on the data. The application may, for example, not be able to proceed to another step in a process being performed by the application until a data operation is complete. In such an instance, it may be desirable to store data utilized by the application in a higher performance data store in order to optimize performance of the application.

At other times, however, it may not be desirable to store data in a higher performance data store. Organizations, for example, often archive vast amounts of information about their operations for various purposes. Customers, for instance, may wish to view orders they have placed with an organization over several years. The organization may access the data in order to look at historical trends, to provide information to auditors and/or governmental organizations, or generally for any appropriate reason. In such instances, the speed at which the data can be operated upon is generally an insignificant factor and, therefore, it may be desirable to store the data in a more cost-effective storage. Thus, the use of multiple performance-related tiers allows an organization to spread data among several data stores as appropriate, which can help to optimize and/or balance various aspects including cost savings and performance.

Returning to the example of FIG. 2, the hot data storage 216 may provide access to data through an RDBMS or other high-performance data management system. The particular schema used by the hot data storage 216 may be optimized for performance with respect to access to the data, such as by optimizing the tables of a relational data base for quick CRUD operations. The warm data storage 218, as discussed, may exhibit lower performance than the hot data storage 218 for one or more CRUD operations. For example, the warm data storage 218 may utilize the same schema as the hot data storage 218, but use less expensive, but slower hardware. In addition, the warm data storage 218 may utilize another schema that provides better storage capacity, but slower access. Likewise, the cold data storage 220 may utilize other hardware and/or schemas that provide slower performance than the hot data storage 216 and the warm data storage 218, but that perhaps are cheaper to maintain. For instance, the cold data store may be a simple key-based object store where, when data is stored in the cold storage 220, a unique object key is assigned to the data. The unique object key may later be used to retrieve the data and keys may be any string, and may be constructed to mimic hierarchical attributes.

Turning to the data management component 206, in an embodiment, the data management component 206 includes an API level 222, a data function level 224, and a data management level 226. The API level 222, in an embodiment, is an interface for one or more applications to access functions of the data function level 224, as described below. The API level may include a representational state transfer (REST) web service interface, a simple object access protocol (SOAP) interface, and/or other interfaces which may be accessible over a network, such as an intranet and/or the Internet, although an application, in various embodiments, may access the various functions of the data function level 224 directly. The API level may provide applications access to one or more databases and/or other systems for managing and/or processing data. Use of the API level 222 has advantages in that multiple applications may access data stored in the data storage component 204 for various purposes, such as for order processing, data analysis, advertising and other marketing, and, generally, any purpose for which data in the data storage component 204 may be useful.

In an embodiment, an application utilizing APIs of the API level 222 requests data using the syntax of a data container instead of specifying the location of the data among the data stores of the data storage component. A data container, in an embodiment, is a file or other arrangement of a set of data that includes components (also called elements) associated with data from records of a logical schema. In an embodiment, components of a container are associated with records of a logical schema if the container contains information that can be used to locate data from one or more logical schemas. The information may not identify the location in the one or more logical schemas. For instance, in an embodiment, a container may include identifiers, which may be alphanumeric strings or other devices that can be referenced in an index or other mapping that associates identifiers of data with corresponding locations among one or more data stores in order to locate the data. For example, a container may include an identifier for a customer telephone number that can be referenced in an index that associates the identifier with a row and a column in a table of a relational database. The association of a component of a container may be direct, as described above where a single index may be utilized in order to locate data among several data stores, or indirect. For instance, an identifier in a component of a data container may be referenced in an index which provides the data store in which data corresponding to the identifier is located. A separate index for that data store may identify where in the data store the data may be found.

In addition, a component of a container may include information that identifies a location in a logical schema. As an example, a component of a container may indicate the row and column of a table in a relational database in which corresponding data may be found. The data may be found in that row and column of the relational database or that row and column may include information that identifies a location in another data store, such as if the data was once stored in the row and column but was subsequently moved to another data store. The other data store may contain the data or yet another location in which the data may be found. Further, certain data may be stored in a data container itself such that it is not necessary to locate the data among one or more data stores.

An example of a data container is an extensible markup language (XML) file whose elements include references, such as pointers or identifiers of data from a logical schema of a data store. As a more concrete example, a customer order may be represented by an XML file that includes elements and possibly sub-elements that contain values from which data of tables of a relational database can be identified. The data in the tables may include information such as order amounts, product identification numbers, customer identification information, addresses, and the like. Other types of data containers may also be used, such as files that incorporate the Document Object Model (DOM) or other object model and/or programmatic objects. Other examples include files using JavaScript Object Notation (JSON), Joint Photographic Experts Group (JPEG) files, and generally any file that contains data which may include metadata. Generally, a container may be any logical collection of information that can be sent/received among various computing devices. Containers may be associated with unique identifiers that uniquely identify the container and/or parts of the container so that applications can access data from the containers by referring to the unique identifier without having to identify a specific data store (or specific data stores) where the data is located. Unique identifiers may be created by an application that creates containers, such as an application that creates containers for orders every time a new order for items for consumption are received. Other applications may use the same identifiers for accessing the data of the containers. A unique identifier for a container may be a primary key of a relational database table. When a container is accessed, some or all of the data associated with the container may be read from the data store or stores in which the data is stored. When a container is created or modified, new and/or modified data may be loaded into one or more data stores. Loading may occur immediately subsequent to creation or modification of the container or at a later time, such as subsequent to processing of a container by an application.

As an example, an application may be involved in the processing of orders for an electronic marketplace. Data for a customer order may be stored among several locations of a logical schema, such as among multiple tables of a relational database, and different data of the order may be stored in different physical data stores and among multiple logical schemas. As will be discussed more fully below, in an embodiment, the application may simply request the order or a portion of the order, such as a shipping address, without having to specify the location or locations of the requested data among the multiple data stores and/or multiple logical schemas. Thus, from the perspective of those programming applications to use data in a system such as a system described herein, programming is straightforward because, in an embodiment, there is no need for the programmer to keep track of data as it is moved from one data store to another.

The data function level 224, in an embodiment, includes computer logic that enables various data operations according to utilization of APIs of the API level 222. In an embodiment, the data function level 224 includes a load/save component 228, an events component 230, and a find/query component 232. The load/save component 228, in an embodiment, includes logic for performing CRUD operations with data in the data stores in connection with a data management component, such as a hierarchical data manager, described below, that tracks where the data is among the data stores. The load/save component 228, for example, may receive commands made in the syntax of the API level 222 and translate those commands into commands for performing associated CRUD operations.

The events component 230, in an embodiment, includes an import component 234, and export component 236, and a subscription component 238. In an embodiment, the import component 234 allows for, pursuant to application instructions, the import of amounts of data into the data storage component 204 while the export component 236 allows for the export of amounts of data from the data storage component 204. The import and export of data, for example, may be performed as batch operations. For instance, an application may collect data throughout a period of time and periodically load batches of data into the data storage component 204. Likewise, an application may at times need to utilize a large set of data from the data storage component 204 and, therefore, may utilize the export component 236.

The subscription component 238, in an embodiment, allows applications to subscribe to data events in the data storage component 204, such as when a CRUD operation is performed or when certain data meet one or more specified conditions. In an embodiment, applications subscribe to events by specifying data containers and/or portions of data containers and the subscription component 238 subscribes appropriately to events in the data storage component 204. For instance, an application may subscribe to container creation events, such as when a new order is created, and the subscription component 238 may subscribe to an appropriate event of the data storage component 204, such as to the insertion of an entry into a relational database table that corresponds to an order identification number. As another example, an application may subscribe to events corresponding to changes in existing orders and the subscription component 238 may subscribe to corresponding events in the data storage component 204, such as when any entry in a relational database associated with an existing order is changed.

The find/query component 232, in an embodiment, allows applications to perform queries on data stored in the data storage component 204. In an embodiment, data in the data storage component 204 (or at least a portion thereof) is replicated in an index stored separately from the data storage component in order to allow applications quick read access to data without significant adverse effects on the operation of any system for managing the data in the data storage component, such as a RDBMS. In an embodiment, queries to the find/query component 232 are translated by the find/query component 232 from queries in terms of containers into appropriate queries for an index being searched.

The data management level 226, in an embodiment, includes computer logic for processing events, and moving and tracking data among the data storage component 204. In an embodiment, the data management level 226 includes a data manager 240, a storage event bus 242, and an indexing service 244. The data manager 240, an embodiment of which will be described more fully in connection with FIG. 3, may include logic for maintaining data among the data stores of the data storage component 204 and processing events. Events processed by the data manager 240 may be sent to the storage event bus 242 which, in an embodiment, may include an event queue or other mechanism for storing events until they are consumed by subscribers to the events. The indexing service 244, in an embodiment, includes an index and an engine for searching the index. As described above, the index of the indexing service 244 may include a copy of some or all of the data from the data storage component 204 so that applications may use the find/query component in order to quickly access the data stored therein with minimal to no adverse effects on the performance of the data stores.

Figure 3:
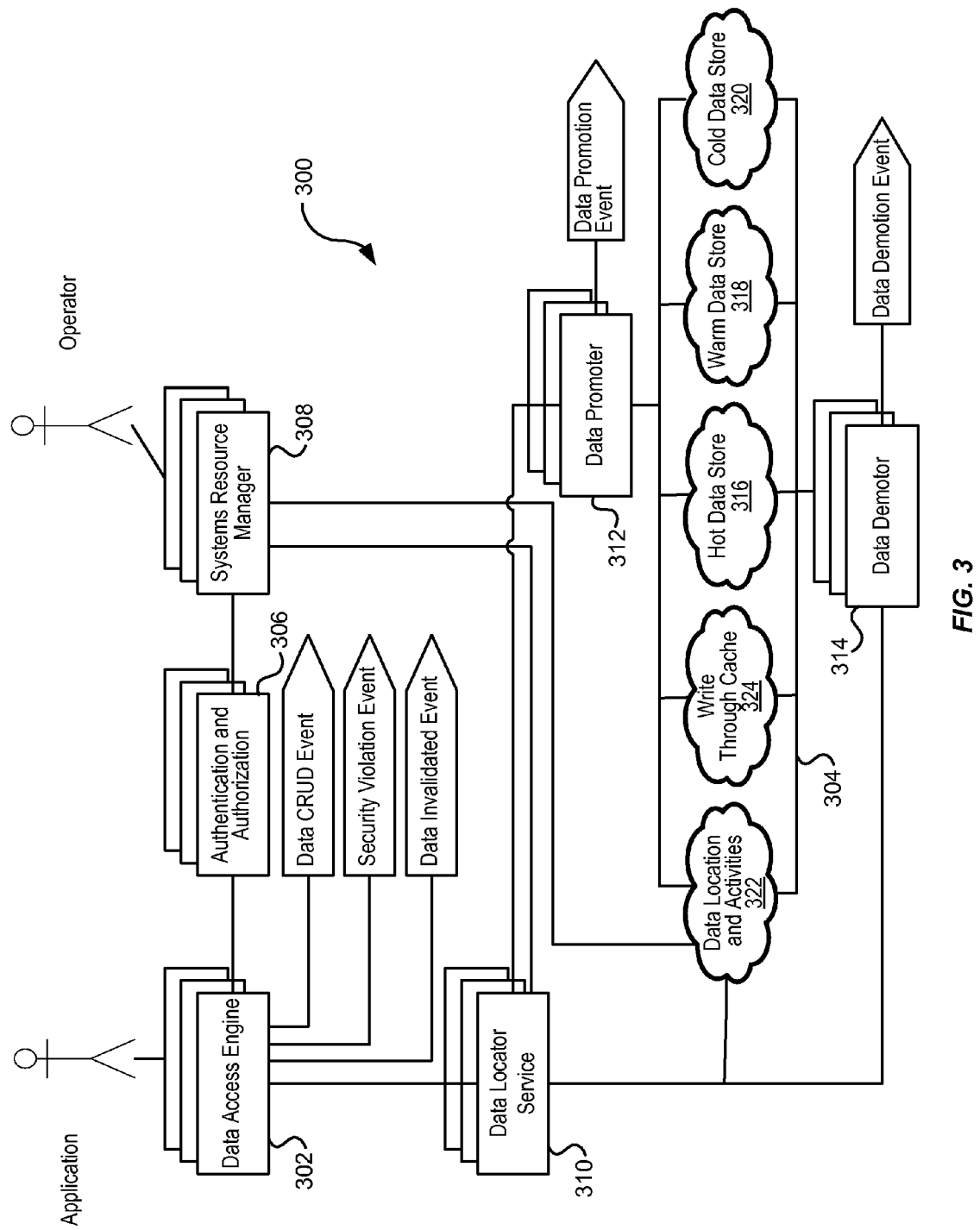
FIG. 3 is a diagrammatic representation of a data manager, which may be utilized in the architecture of FIG. 2, in accordance with an embodiment.

FIG. 3 shows an example data management system 300 for providing access to data which includes components that may be components of the platform described in FIG. 2. The components of FIG. 3 may be implemented as software running on one or more pieces of hardware, such as those described in FIG. 1. Returning to FIG. 3, the system 300 includes a data access engine (DAE) 302, in accordance with an embodiment. In an embodiment, the DAE is a front end for accessing data in a data storage component 304, where the data storage component 304 may be the same as or similar to the data storage component 204 described above in connection with FIG. 2. For instance, the data storage component 304 may include a plurality of data stores having various performance characteristics, as described more fully below.

In an embodiment, the DAE includes the components of the API level 222, data function level 224, and data management level 226, described above, although the DAE may have greater or fewer components. In a cloud computing or other environment, the DAE may be offered as an external offering to third parties who wish to build applications utilizing data in the data storage component 304, which may be their own data or which may be data collected from another source. Various revenue models may be utilized in order to derive revenue from such a third party offering. For instance, third parties may pay based on the amount of data they store in the data storage component 304 per some period of time, where the price may be greater for higher performance data stores of the data storage component 304. In this manner, third parties may choose to pay a premium for higher performance, or may pay less when their applications do not require high performance. Other models include payment based on the amount of data accessed in a particular time period, the number of queries to a data store, and generally any model may be used, including models that do not charge directly, but rely on other forms of revenue, such as advertising.

The DAE, in an embodiment, exposes events and functions. As shown in the drawing, the DAE may expose events to applications such as the occurrence of CRUD operations, security violations, data invalidations (such as update or delete), and other events. The functions exposed may allow applications to perform operations in connection with data in the data storage component 304, such as reading data (loading), inserting data (saving), updating data (saving), deleting data, performing a sync or async operation with data, verifying access control against data, checking if data exists, preemptively promoting or demoting data (async operation) from one data store to another, setting up or updating data disposal data, or other operations.

In an embodiment, when the DAE 302 is utilized by an application, the DAE 302 may access an authentication and authorization services component 306 to assert access control. For instance, the authentication and authorization services component may utilize one or more protocols for authenticating an application and restricting access to data in the data storage component 304 accordingly. As an example, the authentication and authorization services component 306, upon authenticating a third party application, may restrict access to the third party application to certain data, such as data belonging to the third party and/or other data for which the third party has paid for access.

In an embodiment, the system 300 includes a system resource manager 308 in communication with a data locator service 310 and the data storage component 304. The system resource manager 308, in an embodiment, tracks hardware used in the system 300 and may be a component of the data manager, described above. In an embodiment, the system resource manager 308 applies one or more policies in order to manage the resources of the system 300 in order to optimize one or more goals, such as minimizing the total cost of ownership of the system 300 subject to one or more constraints. The policies may be based at least in part on performance characteristics of the data stores in the data storage component, such as speed-related capabilities of the data stores for performing data operations. The speed-related capabilities of the data stores may be limited based at least in part on hardware and/or software used in order to organize and manage data in the data stores. In an embodiment, the system resource manager 308 works as a background process in order to identify data that should be moved from one data store to another based on one or more policies.

For example, policies may be based at least in part on the amount of time that has passed since data was since accessed so that, if data has not been accessed for a predetermined amount of time, it may be moved from one data store to another data store, such as a data store that costs less to operate, but that exhibits lower performance. As a concrete example, when an order is placed in an electronic marketplace, data associated with the order may be stored in a high performing data store while the order is being processed. After an amount of time, such as a day or a week, the data may be moved to a lesser performing data store, and after another amount of time, such as a month, the data may be moved to an even lesser performing data store. Some data associated with the container may be in one data store while other data associated with the container may be moved to one or more other data stores. For instance, data that identifies a customer may remain in a high performing data store when a customer frequently utilizes an electronic marketplace while other data relating to items ordered by the customer may be move to another, lower-performing data store. In this manner, frequently accessed data remains in a high-performance data store where the data can be quickly accessed, while older data that is less likely to be accessed by an application is moved to a more cost-effective data store that may not provide access to the data as quickly.

Policies may also be based at least in part on the type of data to which a policy is applied. For instance, for some applications, it may be desirable to keep some data in a high performing data store, such as the highest performing data store available or one of several data stores exceeding some minimum performance characteristic, regardless of the last time it was accessed. For such data, the system resource manager 308 may maintain a record in order to prevent itself from moving the data to an undesirable data store.

In addition, policies may be based in part on data operations being performed. For instance, the system resource manager 308 may utilize a policy that directs data to move to a higher performing data store in response to activity by an application that results in an update operation being performed on the data. The system resource manager 308 may direct the data to move before or after the operation is performed. If the activity of the application resulted in a read operation (instead of an update operation), then the system resource manager 308 may leave the read data in the data store in which it was already stored until application of another policy caused the data to be moved.

In addition to the above, the system resource manager 308 may move data upon direction from an application. For instance, in an embodiment, the DAE provides applications with an option to specify where data should be stored and thereby override any other policies that may otherwise cause data to be stored in another data store. For example, an application, as part of a call of an API of the DAE, may specify that data being accessed should be in the highest performing data store of the system, in a data store having minimum performance characteristics, or in the lowest cost data store. The system resource manager 308 may move data accordingly. In some instances, the system resource manager 308 may employ policies that allow it to disregard directions from applications regarding the particular data store in which data should be stored. For example, if data is directed by an application to be in a low performing data store, the system resource manager 308 may simply keep the data in a higher performing data store until another policy would cause the data to be moved. In such an instance, if the application was a third party application, the third party may be charged as if the data was in the lower performing data store.

In an embodiment, the system resource manager 308 performs other functions, such as identifying when instances need to be created or deleted for active data stores, and balancing system resources. For instance, if a hot data store comprises a plurality of physical data stores, the system resource manager 308 may move data from one physical data store to another in order to balance the number of read/write operations for each of the physical data stores. Further, the system resource manager 308 may apply one or more policies to data at a container level. As an example, the system resource manager may move all data associated with a container if the container has not been accessed for a period of time determined by the policy. Generally, the system resource manager 308 may determine whether one or more conditions with respect to a container are fulfilled and move some or all of the data associated with the container accordingly.

The data locator service 310, in an embodiment, is responsible for keeping track of where data is among the data stores, keeping track of how frequently it is used and/or updated, identifying data eligible for promotion and/or demotion, and creating appropriate messages for a data promoter 312 and/or data demoter 314. The data locator service 310, in an embodiment, is realized by a server or cluster of servers with a shared state cache and persistent information about all managed containers. The data locator service 314 may expose an internal interface to help manage where data are among the data stores. For instance, the data locator service 310 may receive commands from the data access engine in order to find data by a data identifier (which may be an alphanumeric string or other object that identifies data). The data locator service 310 may also receive commands to force data promotion or demotion from one data store to another, to provide statistics on data (such as times since data was last accessed and/or modified and/or created and/or other statistics), provide the location of new data, move data to a new location, add new resources to the data stores (such as another tier in the data stores and/or another physical data store of an already existing tier), remove a resource from the data stores, coalesce resources in order to prepare for removal, and other actions.

When data is to be moved from a data store to a higher-performance data store, in an embodiment, the data locator service 310 sends a message to the data promoter 312, which is in communication with the data stores and is operable to, upon receipt of the message, cause data to be moved from one data store to another according to the message. The message may specify which datum and/or data should be moved and to which data store the datum and/or data should be moved. Instead of specifying to which data store the datum and/or data should be moved, the message may specify that the data should move up or down one or more tiers. In addition, the message may sometimes specify to which data store a datum and/or data should be moved and at other times specify that the datum should move one or more tiers up or down. Also, the messages may include more complicated commands, such as one or more conditions that should be satisfied before data is moved. In an embodiment, as shown in the drawing, when the data promoter 312 promotes data from one data store to another, the data promoter 312 causes a data promotion event to be published. The data promotion event, for instance, may be consumed by applications that subscribe to data promotion events. Also, the data locator service 310 may, upon publishing of a data promotion event (or, in an embodiment, upon promotion of a plurality of data promotion events) be updated to reflect the current location(s) of moved data.

Similarly, when data is to be moved from a data store to a lower-performance data store, in an embodiment, the data locator service 310 sends a message to the data demotor 314, which is in communication with the data stores and is operable to, upon receipt of the message, cause data to be moved from one data store to another according to the message, where the message may be as above. While the drawing shows the data promoter 312 and data demoter 314 as separate units, the data promoter 312 and data demoter 314 may be a single unit. Also, the data promoter 312 and data demoter 314 may be omitted such that the data locator service communicates directly with the data stores. As with the data promoter 312, the data demoter, in an embodiment, causes promotion of a data demotion event to be consumed by one or more applications that subscribe to data demotion events, such as the data locator service.

As discussed above, the data stores may include a hot data store 316, warm data store 318, and cold data 320, although more or fewer data stores may be included in a system according to the present disclosure. Other data storage mechanisms may also be used in accordance with various embodiments of the data management system 300. For instance, in accordance with an embodiment, the data management system 300 includes a data location and activities store 322 that stores the location of some or all of the data in the data stores, the data's created dates, expiration dates, and last updated dates. In an embodiment, the data locator service 310 causes the data location and activities store 322 to be updated whenever certain operations in one of the data stores are performed, such as one or more types of CRUD operations and/or movement of data from one data store to another. In this manner, the data locator service 310 is consistent and may be available at all times to the locator service. The data management system 300 may also include a write-through cache 324 which, in an embodiment, is a data store to which data may be moved during processing of data. For example, in an electronic marketplace, data associated with an order may be stored in the write-through cache 324 while the order is being processed. In an embodiment, the write-through cache 324 is omitted.

Figure 4:
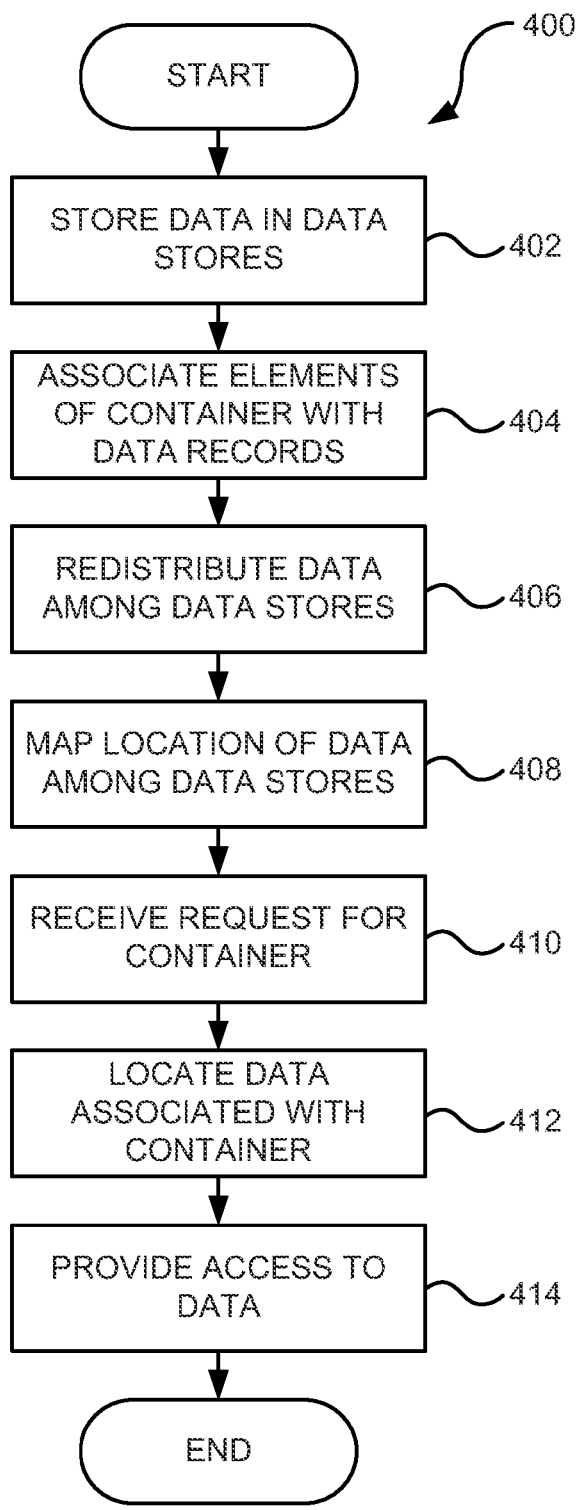
FIG. 4 is a flowchart showing steps of a method for providing access to data, in accordance with an embodiment.

FIG. 4 shows a method 400 for providing access to data. The method shown in FIG. 4, or variations thereof, may be performed under the control of one or more computer systems configured with executable instructions. Further, the method 400 or variations thereof may be included on a computer-readable storage medium that may be read by one or more computer systems in order to perform the method. As shown in the drawing, in an embodiment, the method 400 includes associating elements of a data container with records of a logical schema of at least one data store, where data is stored among several data stores. Data may be moved from one data store to another based at least in part on one or more policies and a mapping may be maintained so that data may be located among the data stores. When a request to access a data container is made, in an embodiment, the mapping is used in order to locate and provide data associated with the container.

Turning to the drawing, at a data storage step 402, data is stored among a plurality of data stores that differ according to the speed at which data operations, such as CRUD operations, can be performed. For instance, data may be stored among a hot data store, warm data store, and cold data store, as described above. Data may be stored in as little as two data stores and in more than three data stores. While FIG. 4 shows the data storage step 402 as a concrete step in the method, it should be understood that the step, and other steps described herein, as appropriate, may be performed continuously throughout performance of the method.

At a container association step 404, elements of a data container are associated with records of a logical data storage schema utilized by at least one of the data stores. In an embodiment, associating the elements of the data container includes storing the data container in a manner that allows data associated with the elements to be located from among the data stores. For example, a data container may be created that includes identifiers for the data from which a data locator service, such as a data locator service described above, can locate data from among the data stores according to a mapping of the identifiers to locations in the data stores, such as to locations in tables of a relational database. When the container is created, the associated data may be loaded into one or more of the data stores accordingly, as described above.

In an embodiment, at a redistribution step 406, data is redistributed among the data stores according to at least one policy. For example, data may be redistributed according to one or more policies discussed above. Data redistribution may be predicated on particular actions, such as certain types of data operations, and/or may be performed by an agent (or several agents) that runs as a background process which reads metadata associated with data and determines whether any policies apply to the data and, if appropriate, moves data according to any applicable policy.

As data is moved from one data store to another, in an embodiment, at a mapping step 408, a map is maintained that identifies where among the data stores data is located. A map may be in an index that associates identifiers of data with corresponding locations of data among the data stores. For example, as discussed above, a data container may include an identifier for a datum associated with the container. If the datum is initially stored in a hot data store that incorporates a relational database, a mapping may associate the identifier with a table and a location in the table where the datum is stored. If the datum is moved to a cold data store that stores data according to another logical schema, the mapping, in an embodiment, is updated accordingly to associate the identifier with the new location in the cold data store. If the cold data store utilizes its own identifiers for data, the mapping may associate the identifier of the container with the identifier of the cold data store. Generally, any way of maintaining a record of where data may be found from among the data stores may be used.

In an embodiment, at a request step 410, a request to access at least one element of the data container is received. The request may be to perform an operation with respect to a portion of the container or the whole container. For instance, the request may be to create, read, update or delete a portion of the data container, or to perform an operation with respect to the complete container. As an example, an application may request to read or update the shipping address of a particular order. As another example, an application may request to delete the complete order. In an embodiment, as discussed above, the request is independent of the location of the data to which access is requested. The request may be independent of any physical location among the data stores and/or any location of any logical schema utilized by data stores. For example, in an embodiment, the request identifies the container and perhaps any specific elements of the container to be accessed without specifying where the data is stored among the data stores. As another example, the request may identify a location in the data stores (such as the location in a particular table of a relational database) when the data is actually stored in another location among the data stores.

In an embodiment, responsive to the request, at a location step 412 the data associated with the requested element or elements of the container is located. Locating the data may include using the mapping to locate the data from among the data stores. For instance, locating the data may involve referencing an identifier of the data in an index that associates the identifier with the location of the data among the data stores. Locating the data may also include moving data into another data store according to one or more policies. For example, if the request includes an instruction for changing the data, the data may be moved to a higher performing data store relative to the data store in which the data was located at the time of the request. The mapping may be updated accordingly. If the request is only to read data, the data may be left in its current data store. Generally, locating the data may include moving the data to an appropriate data store based at least in part on one or more policies applied to the request and may include determining to leave data in a current data store based at least in part on one or more policies.

At an access step 414, access is provided to the data associated with the element or elements to which access is requested. Providing access to the element may involve performing an operation on the data according to the request. For example, if the request is to read the data associated with the container element(s) the data may be provided to the requestor. If the request is to update the element of the container, then the corresponding data may be updated accordingly. Likewise, if the request is to delete an element of the container, the associated data may be deleted. Generally, any operation may be performed in accordance with the data associated with the requested element of the container, including CRUD or other operations.

Figure 5:
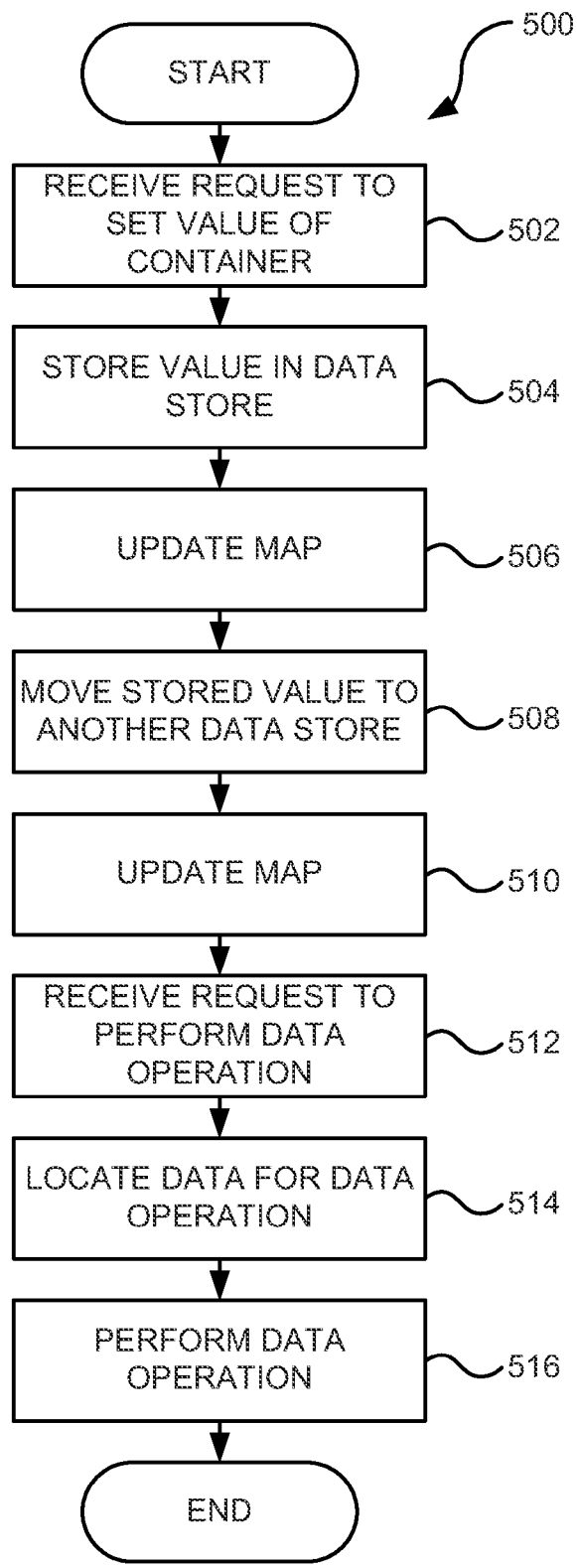
FIG. 5 is a flowchart showing steps of a method for providing access to data, in accordance with another embodiment.

FIG. 5 shows a method 500 for providing access to data, in accordance with an embodiment. Generally, the method 500 proceeds by receiving a request to set an element of a data container to a value corresponding to that element. For example, an application may request to set an order total amount to a particular amount. In response to the request, the value is stored in one of a plurality of data stores and a mapping that keeps track of where data is among the data stores is updated.

Turning to the steps of the method 500, as illustrated in FIG. 5, at a request receipt step 502, a request to set at least one element of a data container to at least one corresponding value is received. In an embodiment, the request is received from an application, such as in a manner described above. For instance, the application may request to create a data container, to modify one or more values of an existing data container, or generally to perform any operation in connection with a data container by which at least one value associated with the data container is set.

Responsive to the request, in an embodiment, at a data storage step 504 the values corresponding to the elements of the data container that were requested to be set are stored in at least one of a plurality of data stores. In an embodiment, the data stores collectively store a set of data and at least two of the data stores provide access to data at different speeds. For example, the plurality of data stores may include two or more of the data stores described above.

In an embodiment, at a map updating step 506, a mapping of the set of data to corresponding locations among the data stores is updated so that the location of the values corresponding to the elements of the data container are locatable in the data stores using the mapping. Updating the mapping may include adding identifiers for the data into an index that associates identifiers of the data with locations of the data stores such that a data locator service can receive a data identifier and locate corresponding data in the data stores. Updating the mapping may also include modifying existing entries in an index in instances where the request results in movement of data from one data store to another, such as in a manner described above. In an embodiment, the updating step 506 is performed after redistributing data from one data store to another, although it may be done at other times, such as prior to redistributing data.

In various embodiments, the method 500 includes additional steps that are illustrated in FIG. 5. For instance, in an embodiment, the method 500 includes, at a moving step 508, moving the one or more corresponding values from one of the data stores to another of the data stores. For instance, the data may be moved according to one or more policies, such as in a manner described above. Once the data is moved, at an updating step 510, the mapping is updated to reflect new location(s) for the data that were moved so that the mapping remains current and accurate.

In accordance with an embodiment, as shown in FIG. 5, the method 500 includes an operation request step 512 at which a request to perform an operation on an element of the data container is received. For instance, an application may request to read or modify data associated with the data container. At a location step 514, the data on which the operation is requested to be performed is located using the mapping, such as in a manner described above. At a performance step 516, in an embodiment, the requested operation is performed. If performance of the operation results in movement of data from one container to another, the mapping may be updated accordingly.

As discussed above, the various embodiments can be implemented in a wide variety of operating environments, which in some cases can include one or more user computers, computing devices, or processing devices which can be used to operate any of a number of applications. User or client devices can include any of a number of general purpose personal computers, such as desktop or laptop computers running a standard operating system, as well as cellular, wireless, and handheld devices running mobile software and capable of supporting a number of networking and messaging protocols. Such a system also can include a number of workstations running any of a variety of commercially available operating systems and other known applications for purposes such as development and database management. These devices also can include other electronic devices, such as dummy terminals, thin-clients, gaming systems, and other devices capable of communicating via a network.

Various aspects also can be implemented as part of at least one service or Web service, such as may be part of a service-oriented architecture. Services such as Web services can communicate using any appropriate type of messaging, such as by using messages in extensible markup language (XML) format and exchanged using an appropriate protocol such as SOAP (derived from the "Simple Object Access Protocol"). Processes provided or executed by such services can be written in any appropriate language, such as the Web Services Description Language (WSDL). Using a language such as WSDL allows for functionality such as the automated generation of client-side code in various SOAP frameworks.

Most embodiments utilize at least one network that would be familiar to those skilled in the art for supporting communications using any of a variety of commercially available protocols, such as TCP/IP, OSI, FTP, UPnP, NFS, CIFS, and AppleTalk. The network can be, for example, a local area network, a wide-area network, a virtual private network, the Internet, an intranet, an extranet, a public switched telephone network, an infrared network, a wireless network, and any combination thereof.

In embodiments utilizing a Web server, the Web server can run any of a variety of server or mid-tier applications, including HTTP servers, FTP servers, CGI servers, data servers, Java servers, and business application servers. The server(s) also may be capable of executing programs or scripts in response to requests from user devices, such as by executing one or more Web applications that may be implemented as one or more scripts or programs written in any programming language, such as Java®, C, C# or C++, or any scripting language, such as Perl, Python, or TCL, as well as combinations thereof. The server(s) may also include database servers, including without limitation those commercially available from Oracle®, Microsoft®, Sybase®, and IBM®.

The environment can include a variety of data stores and other memory and storage media as discussed above. These can reside in a variety of locations, such as on a storage medium local to (and/or resident in) one or more of the computers or remote from any or all of the computers across the network. In a particular set of embodiments, the information may reside in a storage-area network ("SAN") familiar to those skilled in the art. Similarly, any necessary files for performing the functions attributed to the computers, servers, or other network devices may be stored locally and/or remotely, as appropriate. Where a system includes computerized devices, each such device can include hardware elements that may be electrically coupled via a bus, the elements including, for example, at least one central processing unit (CPU), at least one input device (e.g., a mouse, keyboard, controller, touch screen, or keypad), and at least one output device (e.g., a display device, printer, or speaker). Such a system may also include one or more storage devices, such as disk drives, optical storage devices, and solid-state storage devices such as random access memory ("RAM") or read-only memory ("ROM"), as well as removable media devices, memory cards, flash cards, etc.

Such devices also can include a computer-readable storage media reader, a communications device (e.g., a modem, a network card (wireless or wired), an infrared communication device, etc.), and working memory as described above. The computer-readable storage media reader can be connected with, or be configured to receive, a computer-readable storage medium, representing remote, local, fixed, and/or removable storage devices as well as storage media for temporarily and/or more permanently containing, storing, transmitting, and retrieving computer-readable information. The system and various devices also typically will include a number of software applications, modules, services, or other elements located within at least one working memory device, including an operating system and application programs, such as a client application or Web browser. It should be appreciated that alternate embodiments may have numerous variations from that described above. For example, customized hardware might also be used and/or particular elements might be implemented in hardware, software (including portable software, such as applets), or both. Further, connection to other computing devices such as network input/output devices may be employed.

Storage media and computer-readable media for containing code, or portions of code, can include any appropriate media known or used in the art, including storage media and communication media, such as but not limited to volatile and non-volatile, removable and non-removable media implemented in any method or technology for storage and/or transmission of information such as computer-readable instructions, data structures, program modules, or other data, including RAM, ROM, EEPROM, flash memory or other memory technology, CD-ROM, digital versatile disk (DVD) or other optical storage, magnetic cassettes, magnetic tape, magnetic disk storage or other magnetic storage devices, or any other medium which can be used to store the desired information and which can be accessed by a system device. Based at least in part on the disclosure and teachings provided herein, a person of ordinary skill in the art will appreciate other ways and/or methods to implement the various embodiments.

The specification and drawings are, accordingly, to be regarded in an illustrative rather than a restrictive sense. It will, however, be evident that various modifications and changes may be made thereunto without departing from the broader spirit and scope of the invention as set forth in the claims.

What is claimed:

1. A method of providing access to data, comprising:
under control of one or more computer systems configured with executable instructions,
storing a first portion of data among a plurality of data stores, the plurality of data stores utilizing logical schemas to organize the first portion of the data and at least two of the plurality of data stores differing in at least one ability to perform a data operation;
storing a second portion of the data in an indexed data store that is logically separate from the plurality of data stores;
associating elements of a data file with records of at least one of the logical schemas, the data file represented based at least in part on a markup language;
redistributing at least a subset of the first portion or the second portion of the data among the plurality of data stores according to at least one policy that defines, based at least in part on performance characteristics of the plurality of data stores, where among the plurality of data stores said at least a subset of the first portion or the second portion of the data should be stored;
maintaining, based at least in part on said redistributing, a mapping from which locations in the logical schemas of the data can be ascertained;
generating events indicative of changes in data contained in the plurality of data stores corresponding to said at least a subset of the first portion or the second portion of the data;
updating the second portion of the data in the indexed data store according to the generated events;
receiving a request from a requestor to access at least one element of the data file, the request being independent of the location of data associated with said at least one element;
responsive to the request, locating, based at least in part on the mapping, the data that is associated with said at least one element of the data file; and
providing access to the data that is associated with said at least one element to the requestor.

2. The method of claim 1, wherein said redistributing includes moving some data associated with the data file to a first data store utilizing a first logical schema while other data associated with the data file remains in a second data store utilizing a second logical schema different from the first logical schema.

3. The method of claim 1, wherein:
performance characteristics with respect to a speed at which data operations can be performed of at least a plurality of the data stores differ from one another; and
the method further comprises recording third party access statistics with respect to said at least a plurality of the data stores.

4. The method of claim 1, further comprising:
responsive to the request, determining whether to move said at least a first portion of the data that is associated with said at least one element of the data file from a current data store of the plurality of data stores in which said at least a first portion of the data is stored in another of the plurality of data stores; and
moving said at least a first portion of the data according to said determining.

5. The method of claim 1, wherein the data file comprises a plurality of objects of an object model, said at least one element associated with one of the plurality of objects.

6. The method of claim 1, wherein said redistributing includes:
determining, at a time independent of any request for said at least a subset of the first portion or the second portion of the data and according to said at least one policy, whether to move said at least a subset of the first portion or the second portion of the data from one data store of the plurality of data stores to another data store of the plurality of data stores; and
moving said at least a subset of the first portion or the second portion of the data according to said determining.

7. A method of providing access to data, comprising:
under control of one or more computer systems configured with executable instructions,
storing a first portion of data among a plurality of data stores, the plurality of data stores utilizing logical schemas to organize the first portion of the data and at least two of the plurality of data stores differing in at least one ability to perform a data operation;
storing a second portion of the data in an indexed data store that is logically separate from the plurality of data stores;
associating, at least by a mapping from which locations in the logical schemas of the data can be ascertained, data files with locations of corresponding data among the data stores, the data files represented based at least in part on a markup language;

redistributing at least a subset of the first portion or the second portion of the data among the plurality of data stores according to at least one policy that defines, based at least in part on the at least one ability to perform a data operation, where among the plurality of data stores said at least a subset of the first portion or the second portion of the data should be stored;

generating events indicative of changes in data contained in the plurality of data stores corresponding to said at least a subset of the first portion or the second portion of the data;

updating the second portion of the data in the indexed data store according to the generated events;

receiving a request from a requestor to access particular data corresponding to a data file of the data files;

locating, based at least in part on the mapping, the particular data from the plurality of data stores; and providing the particular data to the requestor.

8. The method of claim 7, further comprising updating the mapping in accordance with said redistributing.

9. The method of claim 7, wherein said redistributing includes determining, at a time independent of any request to access said at least a subset of the first portion or the second portion of the data, whether said at least a subset of the first portion or the second portion of the data should be moved according to said at least one policy.

10. The method of claim 7, wherein said redistributing includes determining, responsive to the request from the requestor, whether said at least a subset of the first portion or the second portion of the data should be moved according to said at least one policy.

11. The method of claim 7, wherein data corresponding to elements of the data file are distributed among at least two of the data stores and wherein the request is independent of a location of the particular data among said at least two of the data stores.

12. A system for providing access to data, comprising:

a plurality of data stores having a first portion of the data distributed therein, the plurality of data stores utilizing logical schemas to organize the data and at least two of the plurality of data stores differing in at least one ability to perform a data operation;

an indexed data store that is logically separate from the plurality of data stores, having a second portion of the data distributed therein;

a data manager operable to:

associate, at least by a mapping from which locations in the logical schemas of the data can be ascertained, data files with locations of corresponding data among the plurality of data stores, the data files represented based at least in part on a markup language;

receive events indicative of changes in a storage location of said at least a subset of the first portion or the second portion of the data;

redistribute said at least a subset of the first portion or the second portion of the data among the plurality of data stores or indexed data store according to at least one policy that is based at least in part on the at least one ability to perform a data operation;

update the second portion of the data in the indexed data store according to the received events;

receive a request from a requestor to access particular data associated with a data file of the data files;

locate, based at least in part on the mapping, from the plurality of data stores responsive data that is associated with the data file; and provide the responsive data to the requestor.

13. The system of claim 12, wherein the data manager is operable to update the mapping in accordance with a redistribution of said at least a portion of the data among the plurality of data stores.

14. The system of claim 12, wherein the data manager is operable to, independent of any request to access said at least a subset of the first portion or the second portion of the data, redistribute said at least a subset of the first portion or the second portion of the data among the plurality data stores according to at least one policy.

15. The system of claim 12, wherein the data manager is operable to determine, responsive to the request, whether said at least a subset of the first portion or the second portion of the data should be moved according to said at least one policy.

16. The system of claim 12, wherein said at least one policy is based at least in part on speed-related capabilities of the plurality of data stores.

17. The system of claim 12, wherein the request is independent of a location of the particular data among the plurality of data stores.

18. A non-transitory computer-readable storage medium, having stored thereon instructions for causing at least one computer system to perform a method of providing access to data, the method comprising:

storing a first portion of data among a plurality of data stores, the plurality of data stores utilizing logical schemas to organize the first portion of the data and at least two of the plurality of data stores differing in at least one ability to perform a data operation;

storing a second portion of the data in an indexed data store that is logically separate from the plurality of data stores;

associating, at least by a mapping from which locations in the logical schemas of the data can be ascertained, data files with locations of corresponding data among the plurality of data stores, the data files represented based at least in part on a markup language;

redistributing at least a subset of the first portion or the second portion of the data among the plurality of data stores according to at least one policy that defines, based at least in part on the at least one ability to perform a data operation, where among the plurality of data stores said at least a subset of the first portion or the second portion of the data should be stored;

generating events indicative of changes in data contained in the plurality of data stores corresponding to said at least a subset of the first portion or the second portion of the data;

updating the second portion of the data in the indexed data store according to the generated events;

receiving a request from a requestor to access particular data corresponding a data file of the data files;

locating, based at least in part on the mapping, the particular data from the data stores; and providing the particular data to the requestor.

19. The computer-readable storage medium of claim 18, wherein the method further comprises updating the mapping in accordance with said redistributing.

20. The computer-readable storage medium of claim 18, wherein said redistributing includes determining, at a time independent of any request to access said at least a first portion or second portion of the data, whether said at least a first portion or second portion of the data should be moved according to said at least one policy.

21. The computer-readable storage medium of claim 18, wherein said redistributing includes determining, responsive to the request from the requestor, whether said at least a first portion or second portion of the data should be moved according to said at least one policy.

22. The computer-readable storage medium of claim 18, wherein the request is independent of a location of the particular data among the plurality of data stores.

23. A computer-readable storage medium having stored thereon instructions for causing one or more computer systems to perform a method of providing access to data, the method comprising:

receiving a request to set at least one element of a data file to at least one corresponding value, the data file formatted in a markup language; and responsive to the request, storing said at least one corresponding value in at least one of a plurality of data stores that collectively store a set of data, wherein at least two of the plurality of data stores differ in at least one ability to perform a data operation, wherein at least one of the plurality of data stores utilizes logical schemas to organize the data, and wherein the at least one element of the data file is associated with records of at least one of the logical schemas; and moving said at least one corresponding value from said at least one of the plurality of data stores to an indexed data store such that said at least one corresponding value is accessible by location-independent requests, the moving of said at least one corresponding value according to at least one policy that defines, based at least in part on an ability to perform a data operation, whether to store said at least one corresponding value in the plurality of data stores or the indexed data store.

24. The computer-readable storage medium of claim 23, wherein the request is to create said at least one element.

25. The computer-readable storage medium of claim 23, wherein the method further comprises:

receiving a request to perform at least one operation on said at least one element;

using a mapping to locate said at least one corresponding value from the plurality of data stores; and performing said at least one operation.

26. The computer-readable storage medium of claim 23, further comprising:

moving said at least one corresponding value from the indexed data store to one of the plurality of data stores; and updating a mapping consistent with the moving.

\* \* \* \* \*